March 13, 1962 P. H. JEYNES, JR 3,024,947
SYNTHETIC RESIN BOTTLES
Filed July 14, 1959

INVENTOR.
PAUL H. JEYNES, JR.
BY
Morgan, Finnegan, Durham & Pine
ATTORNEYS.

United States Patent Office 3,024,947
Patented Mar. 13, 1962

3,024,947
SYNTHETIC RESIN BOTTLES
Paul H. Jeynes, Jr., Hartsdale, N.Y., assignor to Chesebrough-Pond's Inc., New York, N.Y., a corporation of New York
Filed July 14, 1959, Ser. No. 826,986
1 Claim. (Cl. 222—80)

This invention relates generally to synthetic resin bottles, particularly polyethylene bottles, which have become widely popular as a packaging means for various liquids such as therapeutic preparations, medicinal preparations, cosmetic preparations, hair preparations, deodorants, and the like. More particularly, this invention relates to polyethylene squeeze bottles of utility especially for the storing and dispensing of such preparations, particularly nasal sprays.

Polyethylene has been and is widely used in the production of squeeze bottles for the storage and distribution of such preparations in that it is relatively chemically inert, has the necessary flexibility to function as a squeeze bottle, and can be easily fabricated in quantity at a reasonable cost. However, polyethylene and other synthetic resins which are useable as bottle material, are permeable to many organic liquids, including a large number of conventional chemicals which are widely used in fluid preparations for which the polyethylene bottle is highly desirable. Representative chemicals, for example, which permeate with various degrees of rapidity through polyethylene at room temperature, include straight chain hydrocarbons, aromatic hydrocarbons, esters, ketones and various other non-polar fluids. Hence, if a preparation such as a nasal spray is to contain aromatics such, for example, as menthol or eucalyptol, to enhance its user appeal, it is desirable to coat or line the bottle in which it is packaged with a material which will resist permeation by these aromatics, so as to prevent their bleeding through the container walls in storage, and which will still preserve the flexibility inherent to the use of the polyethylene. Various materials for this purpose are disclosed in U.S. Patents Nos. 2,830,721, 2,836,318, 2,836,319, 2,860,801, and others.

This coating or lining of the bottle has proved to be highly satisfactory as a means of prolonging shelf time but nevertheless introduces a considerable element of increased cost in the manufacture of the bottle unit and one which, in such a large volume field as that of nasal sprays in polyethylene squeeze bottles, can spell the difference between a profitable and an unprofitable manufacture, sale, and distribution operation.

Accordingly, it is among the objects of this invention to provide a new and improved synthetic resin bottle which will enable a liquid preparation to which the synthetic resin is relatively impermeable and an additive material to which the synthetic resin is relatively permeable, to be packaged together, without the necessity of first coating or lining the interior or exterior of the bottle, and which will also enable the liquid preparation and the additive material to be commingled in the bottle when and as desired, whereby loss of additive material through the bottle walls, and wetting, defacing or disfiguring of the bottle's exterior surface may be avoided during storage, and shelf life or time extended and preserved.

It is another object of this invention to provide a new and improved synthetic resin bottle which will enable a liquid preparation to which the synthetic resin is relatively impermeable and a chemical to which the synthetic resin is relatively permeable, to be packaged together, but in segregated relation therein, and yet will enable the liquid preparation to be dispensed in admixture with the chemical, at will.

It is a further object of this invention to provide a new and improved polyethylene squeeze bottle for packaging together a nasal spray preparation and an additive to which the polyethylene is relatively pervious, and for dispensing the nasal spray preparation in admixture with the additive.

Other and further objects of this invention will appear from the following description, the accompanying drawings and the appended claims.

According to the invention, there is provided a synthetic resin bottle having a neck including a supporting shelf, a stopper inserted in the neck to a position short of a fully-inserted position, and a liquid-containing capsule positioned between the stopper and shelf for rupturing by the stopper upon movement of the stopper to its fully inserted position.

According to a further feature of the invention, the stopper is of a configuration at its inner end to provide at least one relatively slim projection for puncturing the capsule.

According to another feature of the invention the capsule is ring-shaped and the stopper is constructed and arranged to provide a spray nozzle having a fluid supply tube extending through the central opening of the ring capsule. Preferably, the stopper and the neck are fashioned to provide a locking bead on one and a matching locking recess on the other, the bead and recess being suitably located so that upon movement of the stopper to its fully-inserted position, the bead will seat in the recess to lock the stopper in place. Preferably also the bottle neck is externally threaded and carries a cap in threaded engagement therewith, the cap serving not only as a removable closure but also as a means for enabling the user to move the stopper axially to its fully-inserted position to rupture the capsule.

According to the invention moreover, the capsule is made of a thin sheet material, preferably aluminum, relatively impervious to the additive, yet readily rupturable under the pressure exertable by the stopper, to release the capsule's liquid contents. The bottle, including its threaded cap, is preferably constructed of polyethylene.

In the accompanying drawings which form part of the instant specification and are to be read in conjunction therewith, and in which like numbers refer to like parts throughout the several views, FIG. 1 is a broken view in side elevation of a synthetic resin squeeze bottle embodying this invention;

Figure 2:
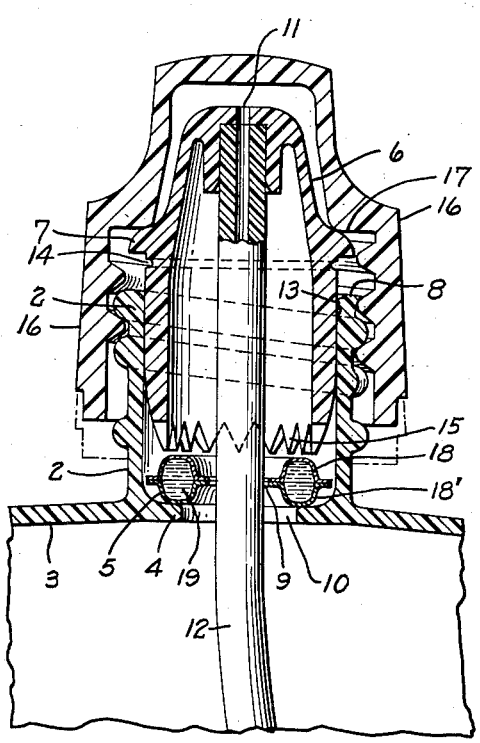
FIG. 2 is an enlarged fragmentary view in section taken along the line 2—2 of FIG. 1, showing the spray nozzle and capsule prior to rupturing.

Referring now more particularly to the drawings, a flexible squeeze bottle 1 of a synthetic resin material, preferably polyethylene, is provided at the juncture of the neck 2 and the body portion 3, with a shelf 4 extending radially inwardly of the neck, for supporting a liquid-containing capsule 5. A hollow spray nozzle 6 is slidably snugly inserted in the neck 2 to a position in which, as shown in FIG. 2, the inner end of the nozzle is closely adjacent to the capsule 5. In this position, a radially outwardly extending annular flange 7 of the spray nozzle lies in axially-spaced relation to the annular rim 8 of the neck 2. By reason of the spacing, the spray nozzle may be pressed further inwardly to the fully-inserted position shown in FIG. 4 in which the annular flange 7 is seated on the rim 8 and the inner end of the nozzle is disposed in the space occupied by the capsule 5. As a result, the capsule will be compressed between the nozzle and the shelf 4 to an extent sufficient to rupture the capsule and permit its liquid contents to empty into the body portion 3 of the bottle. Thus, the capsule contents may be commingled with a liquid preparation contained in the bottle, for dispensing in admixture with the liquid preparation through the nozzle.

The capsule 5 is preferably ring-shaped and thus possesses a central opening 9. Likewise, the shelf 4 is preferably annular and is of a width, radially, sufficient to support the capsule in position under pressure of the nozzle. Preferably, the shelf 4 is integral with the bottle, and may be formed in the blowing of the bottle.

Figure 1:
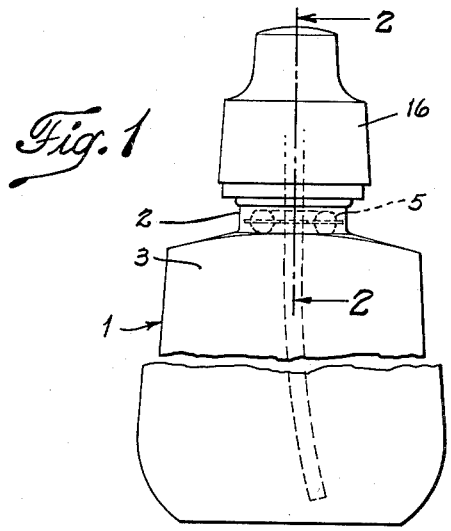
Figure 3:
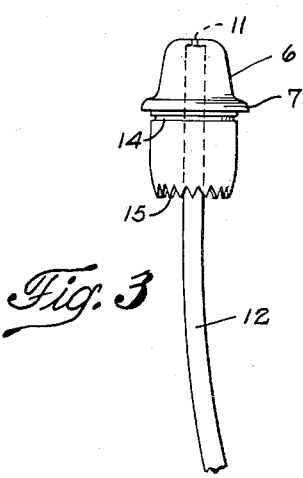
FIG. 3 is a view in elevation of the spray nozzle of FIG. 2.
Figure 4:
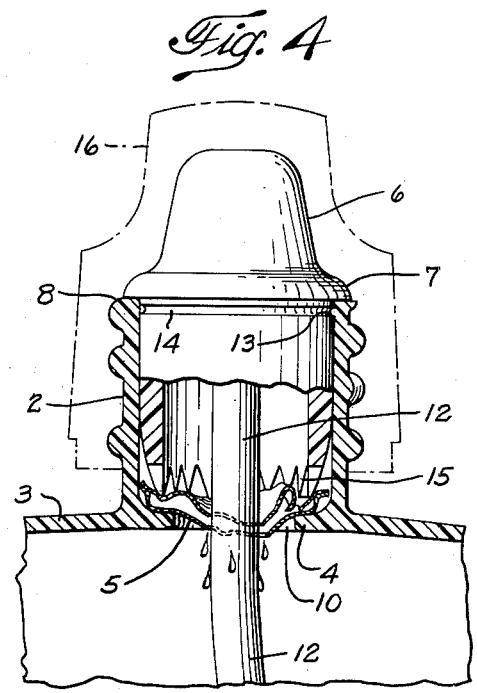
FIG. 4 is an enlarged fragmentary view with parts in section similar to the showing of FIG. 2 but with the spray nozzle in its fully-inserted position and the capsule ruptured.

The nozzle 6 as here preferably embodied, is provided with a spray orifice 11 from which a suitable liquid preparation (not shown) contained in the bottle is adapted to be dispensed as a spray upon squeezing of the bottle. A tube 12 for supplying the liquid preparation to the spray orifice 11, leads from the spray opening 11 through the aligned capsule and flange openings 9 and 10, respectively, into the body portion 3 of the bottle and terminates at a location closely adjacent the bottom of the bottle, as indicated in FIG. 1. In assembling the bottle parts for use, capsule 5 is first positioned on the shelf 4, the liquid preparation is then added through the open neck of the bottle, and the nozzle 6 with its attached supply tube 12 is then inserted into the neck 3 to the position shown in FIG. 2. Advantageously, the neck 2 may be provided on its inner surface with a locking bead 13, and the nozzle 6 provided on its outer surface with a complementary circumferential locking recess 14 in which the bead 13 seats when the nozzle is fully inserted as shown in FIG. 4. Thus, once the nozzle has been pressed home to rupture the capsule 5, it cannot be accidentally dislodged and the bottle contents spilled.

The nozzle 6 is tubular and the annular inner end of the nozzle is preferably serrated to provide an annular row of teeth 15 which are adapted to puncture the walls of the capsule 5 as the nozzle is seated. Preferably, also the neck 2 is externally threaded and is threadedly engaged by a closure cap 16 having an internal annular flange portion 17 adapted to abut against the flange 7 of nozzle 6 as the cap is screwed on. Thus, the cap 16 is able to function both as a closure means for the bottle and as a means for pressing home the nozzle 6 to rupture the capsule 5.

The capsule 5, as here preferably embodied, comprises upper and lower layers 18 and 18', respectively, of thin sheet material, preferably aluminum, which are electronically suitably heat sealed together around their inner and outer circumferential margins so as to leave therebetween an annular hermetically sealed space 19 filled with a liquid additive material, for example, methanol, to be commingled with the liquid preparation, for example, a liquid nasal spray preparation, contained in the bottle. Hermetically electronically sealed hollow laminated capsules fabricated from thin aluminum sheeting and having a content of liquid, are well known in the cosmetic and pharmaceutical industry, and require no further description.

It will be observed that the objects of this invention have thus been accomplished. The bottle 3 may be filled with a liquid preparation to which the polyethylene or other synthetic resin material forming the body portion, neck, nozzle and cap of the bottle is relatively impervious. The capsule 5 with its content of an aromatic liquid or of another liquid additive to which the synthetic resin of the bottle is relatively pervious, keeps this additive material out of contact with the pervious bottle parts until such time as the user desires to commingle the additive material with the liquid preparation in the bottle. The capsule wall material being aluminum or other material relatively impervious to the additive material, the shelf time of the bottle is extended almost indefinitely since there will be none of the "bleeding" of additive material through the walls of the bottle. Once the contents of the capsule have been commingled with the liquid preparation in the bottle, the bleeding problem and the possibility of defacing labeling on the bottle and of a sticky, unpleasant coating of the liquid preparation being created on the bottle surface, is not a major factor since the life of the bottle, when put into actual use, is relatively short compared with the shelf time from manufacture to sale before actual use.

Having thus described the invention, what is claimed is:

A polyethylene squeeze bottle having a neck and a body portion; an annular supporting shelf in said neck; a ring-shaped capsule, relatively imprevious to aromatics, mounted on said shelf, said capsule comprising oppositely-disposed thin sheets of aluminum hermetically sealed together around their inner and outer circumferential edges, to provide an annular space between said sheets, said space having a content of liquid for release into said body portion on rupture of said capsule; a spray nozzle inserted in said neck to an initial position short of a fully-inserted position and movable axially inwardly thereof to a final fully inserted position in which it is in engagement with said capsule and external of said body portion, for compressing said capsule against said supporting shelf and rupturing said capsule, said nozzle having a supply tube coupled thereto and extending therefrom through the opening in said capsule into the interior of said body portion and having a radially extending flange in axially spaced relation to the rim of said neck in said initial position; and, a cap member threadedly engaging said neck over said spray nozzle, said cap member having an internal flange for engaging said nozzle flange and moving said nozzle from said initial position to said final position.

References Cited in the file of this patent
UNITED STATES PATENTS

| | | |
|---|---|---|
| 611,292 | Sterne | Sept. 27, 1898 |
| 2,198,564 | Robinson | Apr. 23, 1940 |
| 2,578,907 | Tupper | Dec. 18, 1951 |
| 2,816,549 | Webster | Dec. 17, 1957 |

UNITED STATES PATENT OFFICE

CERTIFICATE OF CORRECTION

Patent No. 3,024,947                  March 13, 1962

Paul H. Jeynes, Jr.

It is hereby certified that error appears in the above numbered patent requiring correction and that the said Letters Patent should read as corrected below.

Column 4, line 28, for "imprevious" read -- impervious --; column 4, line 54, for "Robinson" read -- Robison --.

Signed and sealed this 17th of July 1962.

(SEAL)
Attest:

ERNEST W. SWIDER                  DAVID L. LADD
Attesting Officer                    Commissioner of Patents